US012752802B2

(12) United States Patent
Ko et al.

(10) Patent No.: US 12,752,802 B2
(45) Date of Patent: Oct. 6, 2026

(54) APPARATUS FOR CONTROLLING A VEHICLE AND METHOD THEREOF

(71) Applicants: Hyundai Motor Company, Seoul (KR); Kia Corporation, Seoul (KR)

(72) Inventors: Sung Yeon Ko, Hanam-Si (KR); Dong Hwi Lee, Seongnam-Si (KR); Kyoung Jun Lee, Seoul (KR); Keon Yup Chu, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 162 days.

(21) Appl. No.: 18/105,578

(22) Filed: Feb. 3, 2023

(65) Prior Publication Data

US 2024/0051554 A1 Feb. 15, 2024

(30) Foreign Application Priority Data

Aug. 9, 2022 (KR) ........................ 10-2022-0099318

(51) Int. Cl.
*B60W 50/029* (2012.01)
*B60W 50/02* (2012.01)
*B60W 60/00* (2020.01)

(52) U.S. Cl.
CPC ...... *B60W 50/029* (2013.01); *B60W 50/0205* (2013.01); *B60W 60/0015* (2020.02);
(Continued)

(58) Field of Classification Search
CPC .................................................... B60W 50/029
See application file for complete search history.

(56) References Cited

U.S. PATENT DOCUMENTS 8,849,494 B1 * 9/2014 Herbach .............. G05D 1/0044 701/24
8,996,224 B1 * 3/2015 Herbach ............ B60W 60/0011 701/25

(Continued)

FOREIGN PATENT DOCUMENTS

CN 112389461 A 2/2021
JP 6401541 B2 10/2018

(Continued)

OTHER PUBLICATIONS

Google Machine Translation of DE102019115043B4 (2018).*

(Continued)

*Primary Examiner* — Jean Paul Cass
(74) *Attorney, Agent, or Firm* — Banner & Witcoff, Ltd.

(57) ABSTRACT

The present disclosure relates to a vehicle control apparatus and a method thereof. An exemplary embodiment of the present disclosure may provide a vehicle control apparatus that includes: a first controller configured to control one or more safety features of a vehicle; a second controller configured to perform primary control of autonomous driving of the vehicle; and a third controller configured to perform secondary control of the autonomous driving of the vehicle. The first controller may be further configured to determine whether the second controller or the third controller fails during the autonomous driving of the vehicle, and, based on determining that the second controller of the third controller has failed, perform an autonomous driving function of the vehicle.

19 Claims, 5 Drawing Sheets

(52) U.S. Cl.
CPC ................. *B60W 2050/021* (2013.01); *B60W 2050/0292* (2013.01); *B60W 2420/403* (2013.01)

(56) References Cited

U.S. PATENT DOCUMENTS

| | | | | |
|---|---|---|---|---|
| 9,008,890 | B1 * | 4/2015 | Herbach | B60W 30/00 340/436 |
| 9,043,056 | B2 * | 5/2015 | Nemeth | B61B 13/00 701/19 |
| 9,079,587 | B1 * | 7/2015 | Rupp | G05D 1/0289 |
| 9,081,382 | B2 * | 7/2015 | Doyle | A61M 1/1621 |
| 9,096,199 | B2 * | 8/2015 | Yopp | B60T 7/18 |
| 10,611,381 | B2 | 4/2020 | Khalifeh et al. | |
| 2003/0112746 | A1 * | 6/2003 | Schaller | H04L 41/0609 370/242 |
| 2018/0370540 | A1 * | 12/2018 | Yousuf | B60W 10/04 |
| 2019/0020985 | A1 * | 1/2019 | Dai | H04W 8/26 |
| 2021/0387643 | A1 | 12/2021 | Hari et al. | |
| 2023/0339480 | A1 | 10/2023 | Yen | |
| 2024/0010185 | A1 * | 1/2024 | Yasuda | B60L 3/00 |
| 2024/0051554 | A1 * | 2/2024 | Ko | B60W 60/0015 |
| 2024/0051578 | A1 | 2/2024 | Ko | |
| 2024/0166219 | A1 * | 5/2024 | Lim | B60W 50/0205 |
| 2024/0300502 | A1 * | 9/2024 | Lee | B60W 50/0205 |
| 2025/0065919 | A1 | 2/2025 | Yu et al. | |

FOREIGN PATENT DOCUMENTS

| | | | |
|---|---|---|---|
| JP | 2021-031051 | A | 3/2021 |
| KR | 10-2020-0081523 | A | 7/2020 |
| KR | 10-2020-0143309 | A | 12/2020 |
| KR | 10-2021-0006926 | A | 1/2021 |
| KR | 10-2024-0021346 | A | 2/2024 |

OTHER PUBLICATIONS

Mar. 14, 2025—(US) Non-final Office Action—U.S. Appl. No. 18/104,641.

Sep. 24, 2025—(US) Non-final Office Action—U.S. Appl. No. 18/104,641.

* cited by examiner

APPARATUS FOR CONTROLLING A VEHICLE AND METHOD THEREOF

CROSS-REFERENCE TO RELATED APPLICATION

This application claims priority to and the benefit of Korean Patent Application No. 10-2022-0099318, filed in the Korean Intellectual Property Office on Aug. 9, 2022, the entire contents of which are incorporated herein by reference.

BACKGROUND

(a) Field

The present disclosure relates to a vehicle control apparatus and method, and more particularly, to a minimum risk maneuver (MRM) technique of an autonomous vehicle when a main controller fails during autonomous driving.

(b) Description of the Related Art

An autonomous vehicle requires the ability to adaptively respond to changing surroundings in real time while driving. For mass-production and wide adoption of autonomous vehicles, a reliable determination (e.g., decision making) control function may be necessary. Recently released semi-autonomous vehicles are capable of performing basic driving, braking, and steering on behalf of a driver, thereby reducing driver fatigue. In case of semi-autonomous driving, unlike in fully autonomous driving, a driver must maintain his or her attention on driving, including holding a steering wheel continuously. In recent years, semi-autonomous vehicles are being equipped with an highway driving assist (HDA) function and a driver status warning (DSW) function that outputs a warning alarm through a cluster, etc. that can detect driver negligence and status abnormalities such as drowsy driving and eye deviation, a driver awareness warning (DAW) function that checks whether the vehicle is driving unsafely, such as deviating from a lane through a front camera, a forward collision-avoidance assist (FCA) or an active emergency brake (AEBS) function that performs sudden braking if forward collision is detected.

A conventional autonomous driving system may output a request to switch control authority from the autonomous driving system of the autonomous vehicle to a driver, and then if the driver does not take over the control authority for a certain period of time, automatically perform a minimum risk maneuver (MRM). However, if a main autonomous driving controller fails, an MRM mode cannot be performed. Accordingly, it is necessary to cope with a failure of the main autonomous driving controller to perform the MRM even if the failure occurs.

The above information disclosed in this Background section is only for enhancement of understanding of the background of the disclosure, and therefore, it may contain information that does not form the prior art that is already known in this country to a person of ordinary skill in the art.

SUMMARY

An exemplary embodiment of the present disclosure has been made in an effort to provide a vehicle control apparatus and method, capable of performing a minimum risk maneuver (MRM) even when a main controller of an autonomous vehicle fails.

The technical objects of the present disclosure are not limited to the objects mentioned above, and other technical objects not mentioned may be clearly understood by those skilled in the art from the description of the claims.

One or more exemplary embodiments of the present disclosure provide a vehicle control apparatus that includes: a first controller configured to control one or more safety features of a vehicle, a second controller configured to perform primary control of autonomous driving of the vehicle, and a third controller configured to perform secondary control of the autonomous driving of the vehicle. The first controller may be further configured to: determine whether the second controller or the third controller fails during the autonomous driving of the vehicle, and, based on determining that the second controller or the third controller has failed, perform an autonomous driving function of the vehicle.

The first controller may be a chassis subcontroller.

The autonomous driving function may include a minimum risk maneuver (MRM).

The first controller may be further configured to, based on the second controller failing and further based on a command from the third controller, perform the MRM.

The first controller may be further configured to, based on the second controller and the third controller failing, perform the MRM without receiving any vehicle control commands from the second controller or the third controller.

The vehicle control commands may include at least one of a longitudinal control command or a lateral control command.

The second controller may include an electronic control unit (ECU). The third controller may include a front camera.

The second controller and/or the third controller may be configured to transmit failure state information to the first controller based on a determination of a failure state of the second controller and/or the third controller.

The first controller may be further configured to determine the failure state of the second controller and/or the third controller based on the failure state information received from the second controller and/or the third controller.

The first controller may be further configured to determine a failure state of the second controller and/or the third controller by determining disconnection of wired communication with the second controller and/or the third controller.

One or more exemplary embodiments of the present disclosure provide a vehicle control apparatus that includes one or more processors, and memory. The memory may store instructions that, when executed by the one or more processors, cause the vehicle control apparatus to detect a failure of at least one of a main controller configured to perform primary control of autonomous driving of a vehicle, or an auxiliary controller configured to perform secondary control of the autonomous driving of the vehicle; and, based on detecting the failure of the at least one of the main controller or the auxiliary controller, perform an autonomous driving function of the vehicle.

The autonomous driving function may include a minimum risk maneuver (MRM).

The instructions, when executed by the one or more processors, may further cause the vehicle control apparatus to, based on the main controller failing and further based on a command from the auxiliary controller, perform the MRM.

The instructions, when executed by the one or more processors, may further cause the vehicle control apparatus to, based on the main controller and the auxiliary controller failing, perform the MRM without receiving any vehicle control commands from the main controller or the auxiliary controller.

The main controller may include an electronic control unit (ECU). The auxiliary controller may include a front camera.

According to one or more exemplary embodiments of the present disclosure, a method may include determining, by a first controller of a vehicle, whether a second controller or a third controller fails during autonomous driving of the vehicle. The second controller may perform primary control of the autonomous driving of the vehicle, and the third controller may perform secondary control of the autonomous driving of the vehicle. The method may further include performing, by the first controller and based on determining that the second controller or the third controller has failed, an autonomous driving function of the vehicle.

The first controller may be a chassis subcontroller.

The autonomous driving function may include a minimum risk maneuver (MRM).

Performing the autonomous driving function of the vehicle may include performing, by the first controller, the MRM based on the second controller failing and further based on a command from the third controller.

Determining that the second controller or the third controller has failed may include: determining, by the second controller or the third controller, a failure state and transmitting failure state information to the first controller; and determining, by the first controller, the failure state of the second controller or the third controller based on the failure state information.

According to the present technique, it may be possible to improve safety and convenience of an autonomous driving system by performing a minimum risk maneuver (MRM) even when a main controller of an autonomous vehicle fails.

Furthermore, various effects that can be directly or indirectly identified through this document may be provided.

DETAILED DESCRIPTION

Figure 1:
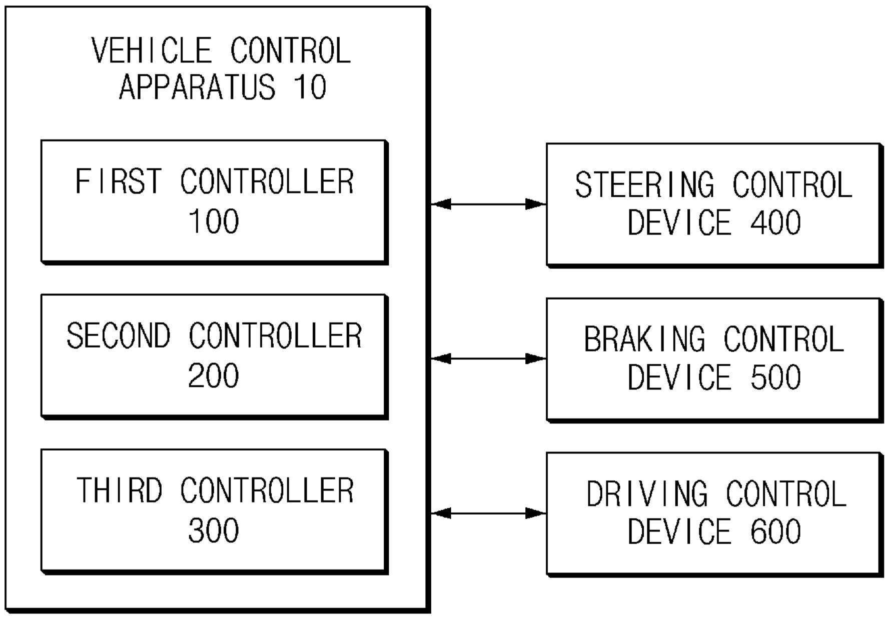
FIG. 1 illustrates a block diagram showing a configuration of an example vehicle system including a vehicle control apparatus.

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to various exemplary embodiments of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 5.

Figure 2:
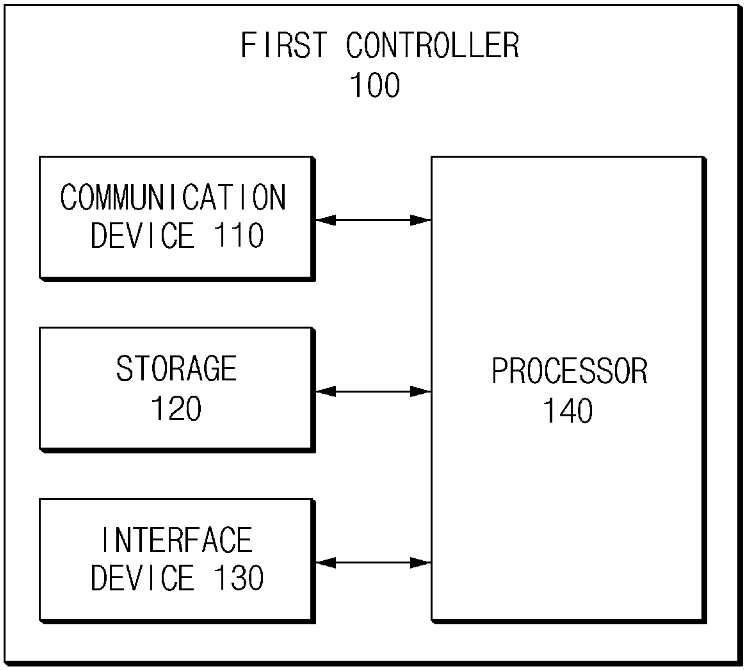
FIG. 2 illustrates a detailed configuration of an example first controller.

FIG. 1 illustrates a block diagram showing a configuration of an example vehicle system including a vehicle control apparatus, and FIG. 2 illustrates a detailed configuration of an example first controller.

The vehicle system of the present disclosure may include a system of an autonomous vehicle. According to the international association of vehicle engineers (SAE), an autonomous vehicle may range anywhere from an advanced driver assistance system (ADAS) to an automatic driving system (ADS), and may be classified based on Levels 0 to 5. ADS, which requires no driver assistance, may be classified Level 3 or higher. It is noted that, in a system of Level 3, a fallback-ready user (FRU) must respond in an emergency situation, and in a system of Level 4 or higher, an autonomous vehicle should be able to respond (e.g., fallback) by itself even in the event of an emergency such as a breakdown. Herein, the response of the autonomous vehicle indicates performing a control (e.g., minimum risk maneuver (MRM)) to switch to a minimum risk condition (MRC) in the event of a failure.

Referring to FIG. 1, the vehicle system according may include a vehicle control apparatus 10, a steering control device 400, a braking control device 500, and an driving control device 600. In this case, the steering control device 400, the braking control device 500, and the driving control device 600 may be controlled and driven by the vehicle control apparatus 10.

The vehicle control apparatus 10 may be implemented inside the vehicle. In this case, the vehicle control apparatus 10 may be integrally formed with internal control units of the vehicle, or may be implemented as a separate device to be connected to control units of the vehicle by a separate connector.

The vehicle control device 10 may include a first controller 100 that performs control for safety of the vehicle, a second controller 200 that performs determination and primary (e.g., main) control of autonomous driving, and a third controller 300 that performs determination and secondary (e.g., subordinately) control of autonomous driving. For example, the second controller 200 may be a main controller, and the third controller 300 may be an auxiliary (e.g., secondary, redundant, subordinate, etc.) controller.

The first controller 100 may determine whether the second controller 200 or the third controller 300 fails during autonomous driving to perform, on behalf of and/or in lieu of the second controller 200 or the third controller 300, an autonomous driving function of the vehicle based on whether the second controller 200 or the third controller 300 is faulty.

The first controller 100 may be related to a safety device of the vehicle, and maintain driving stability by controlling turning stability of the vehicle in response to road changes and controlling maneuverability. The first controller 100 may be a chassis controller. In this case, the chassis controller refers to a controller for a prime mover, a power transmission device, a brake device, a driving device, a suspension device, and/or a steering device, which are components of a chassis, and in the present disclosure, the chassis controller may refer to a controller for a braking device and a steering device that require cooperative control to perform autonomous driving. In this case, the chassis may be a vehicle frame that forms a basis of a vehicle, and refers to a state in which a vehicle body need not be mounted. The chassis may include the prime mover, the power transmission device, the brake device, the driving device, the suspension device, steering device, etc., and because the minimum mechanical devices necessary for the vehicle to travel are installed, the chassis may be drivable on its own.

That is, the first controller 100 may integrate and control an electronic control suspension (ECS) that performs front and rear damper control for a tendency of oversteer or understeer, or an electronic stability control that performs torque vectoring control.

The first controller 100 may include various types of control devices related to vehicle safety, such as a motor driven power steering which assists steering torque, an electronic stability control (ESC) which controls occurrence of understeer and oversteer in a sudden situation such as a sharp curve or an obstacle, an anti-lock brake system (ABS) which shortens a braking distance during sudden braking or driving on icy roads, an autonomous emergency brake (AEB), a tire pressure monitoring system (TPMS) which is an automatic tire pressure monitoring system, an electronic stability program (ESP) for preventing a vehicle from deviating if a driver cannot balance the vehicle when a dangerous or severe situation is encountered while the driver is driving, a vehicle dynamic control (VDC), a traction control system (TCS) for preventing idle wheels, 4 wheel drive, etc.

The second controller 200, which may be an integrated controller, may perform determination and control of the autonomous driving function, and may perform overall control such that each component can perform its functions normally. The second controller 200 may be implemented in the form of hardware, software, or a combination of hardware and software. For example, the second controller 200 may be implemented as one or more microprocessors, but the present disclosure is not limited thereto.

The second controller 200 may include an electronic control unit (ECU) mounted in a vehicle, an engine management system (EMS), a transmission control unit (TCU) for controlling an automatic transmission, and the like.

The second controller 200 may perform a minimum risk maneuver (MRM). That is, if a dangerous situation occurs, the second controller 200 may request the driver to take over control of the vehicle for driving However, the second controller 200 may perform an MRM operation of the vehicle if the take-over of the control authority is not completed within a predetermined (e.g., threshold) time. That is, the second controller 200 may stop the vehicle by decelerating it to a predetermined speed during the MRM operation of the vehicle.

The third controller 300, which may be a subcontroller, may include a front camera and the like.

The third controller 300 may have a redundancy function for performing an autonomous driving function instead of (e.g., on behalf of, in lieu of, etc.) the second controller 200 if the second controller 200 fails. For example, the third controller 300 may perform an autonomous control function corresponding to Level 2 of an autonomous driving level.

If the second controller 200 fails, the third controller 300 may output a control command for the minimum risk maneuver (MRM) to the first controller 100 instead of the second controller 200.

In addition, the third controller 300 may guarantee a lower risk level (e.g., <ASIL) than that of the second controller 200. That is, the automotive safety integrity level (ASIL) represents an automotive safety integrity level. ASIL A represents a lowest level and ASIL D represents a highest level of vehicle risk.

If the second controller 200 fails, the first controller 100 may perform the MRM based on the command of the third controller 300. In addition, if the second controller 200 and the third controller 300 fail, the first controller 100 may perform the MRM without receiving any commands from the second controller 200 and the third controller 300.

The second controller 200 and the third controller 300 may determine their own failure state and transmit failure state information to the first controller 100.

Accordingly, the first controller 100 may determine the failure state of the second controller 200 or the third controller 300 based on the failure state information received from the second controller 200 or the third controller 300.

In addition, the first controller 100 may determine the failure state of the second controller 200 or the third controller 300 by determining disconnection of communication with the second controller 200 or the third controller 300 based on wired network communication (e.g., controller area network (CAN) communication) with the second controller 200 or the third controller 300.

Referring to FIG. 2, the first controller 100 may include a communication device 110, a storage 120, an interface device 130, and a processor 140.

The communication device 110 may be a hardware device implemented with various electronic circuits to transmit and receive signals through a wireless or wired connection, and may transmit and receive information based on in-vehicle controllers and in-vehicle network communication techniques. As an example, the in-vehicle network communication techniques may include controller area network (CAN) communication, local interconnect network (LIN) communication, flex-ray communication, and the like.

As an example, the communication device 110 may communicate with the second controller 200 and the third controller 300 to transmit or receive failure state information of each controller.

The storage 120 may store data and/or algorithms (e.g., instructions) required for the processor 140 to operate, and the like.

The storage 120 may include a storage medium of at least one type among memories of types such as a flash memory, a hard disk, a micro, a memory card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disc.

The interface device 130 may include an input means for receiving a control command from a user and an output means for outputting an operation state of the apparatus 10 and results thereof. Herein, the input means may include a key button, and may include a mouse, a joystick, a jog shuttle, a stylus pen, and the like. Furthermore, the input means may include a soft key implemented on the display.

For example, the interface device 130 may display a driving condition of the vehicle. For example, the interface device 130 may output a screen or a voice notification regarding transferring control authority before entering the MRM.

The interface device 130 may be implemented as a head-up display (HUD), a cluster, an audio video navigation (AVN), or a human machine interface (HMI), and/or a user select menu (USM).

The output device may include a display, and may also include a voice output means such as a speaker. If a touch sensor formed of a touch film, a touch sheet, and/or a touch pad is provided on the display, the display may operate as a touch screen, and may be implemented in a form in which an input device and an output device are integrated. In the present disclosure, the output device may output platooning information such as sensor failure information, lead vehicle information, group rank information, a platooning speed, a destination, a waypoint, a path, and the like.

The display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be electrically connected to the communication device 110, the storage 120, the interface device 130, and the like, may electrically control each component. The processor 140 may include one or more processors, and may be an electrical circuit that executes software commands, thereby performing various data processing and calculations described below.

The processor 140 may process signals transferred between constituent elements of the vehicle control apparatus 10. The processor 140 may be, for example, an electronic control unit (ECU), a micro controller unit (MCU), or other subcontrollers (e.g., auxiliary controllers) mounted in the vehicle.

The processor 140 may perform control for vehicle safety.

The processor 140 may determine whether the second controller 200 or the third controller 300 fails during autonomous driving, and, on behalf of (e.g., in lieu of) the second controller 200 or the third controller 300, perform an autonomous driving function of the vehicle based on the second controller 200 or the third controller 300 failing.

If the second controller 200 fails, the processor 140 may perform the MRM based on the command of the third controller 300.

If the second controller 200 and the third controller 300 fail, the processor 140 may perform the MRM without the need of receiving any commands from the second controller 200 and the third controller 300. The vehicle control command may include at least one of a longitudinal control command, a lateral control command, or any combination thereof.

The processor 140 may determine the failure state of the second controller 200 or the third controller 300 based on the failure state information received from the second controller 200 or the third controller 300.

The first controller 140 may determine the failure state of the second controller 200 or the third controller 300 by determining disconnection of communication with the second controller 200 or the third controller 300 based on a CAN communication with the second controller 200 or the third controller 300.

The steering control device 400 may be configured to control a steering angle of a vehicle, and may include a steering wheel, an actuator interlocked with the steering wheel, and a controller controlling the actuator.

The braking control device 500 may be configured to control braking of the vehicle, and may include a controller that controls a brake thereof.

An driving control device 600 may be configured to control engine driving of a vehicle, and may include a controller that controls a speed of the vehicle.

Figure 3:
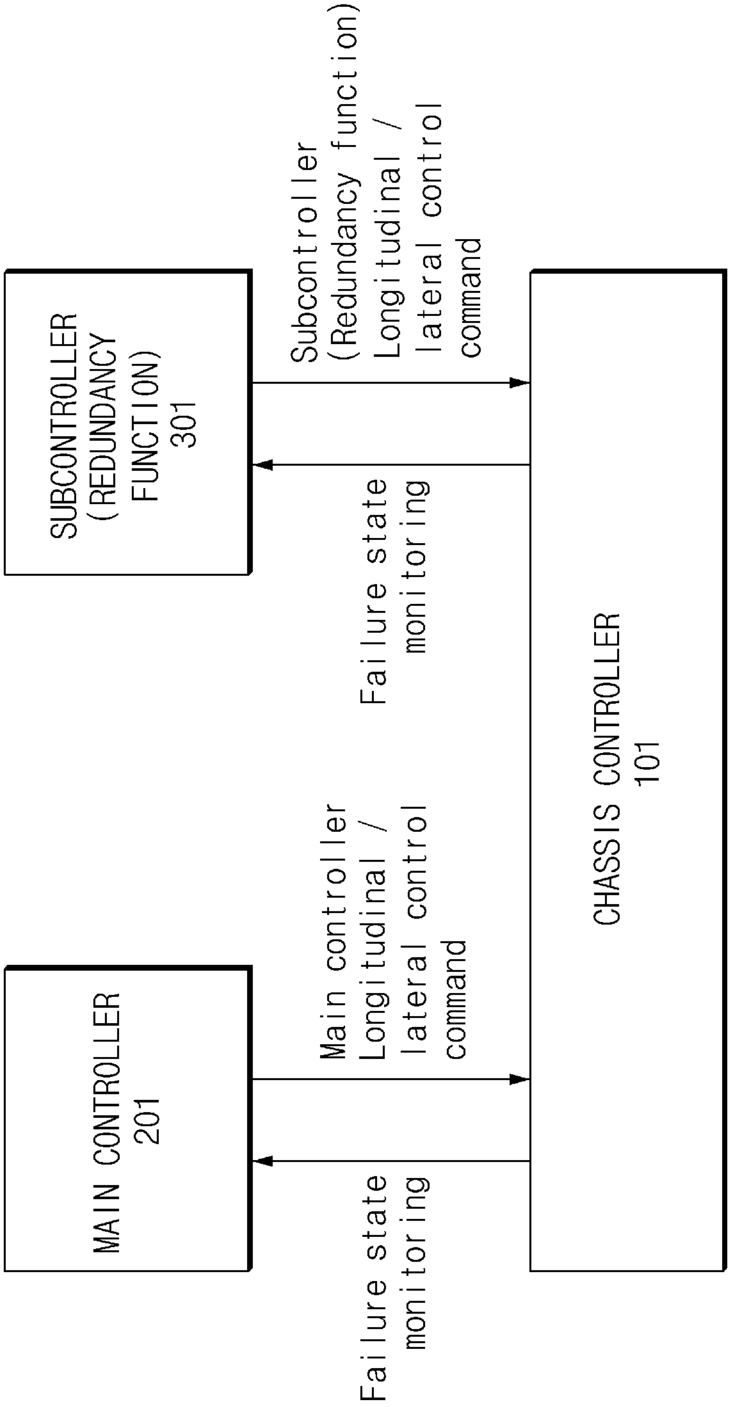
FIG. 3 illustrates a signal flow between controllers of an example vehicle control apparatus.

FIG. 3 illustrates a signal flow between controllers of an example vehicle control apparatus.

FIG. 3 discloses a chassis controller 101 as an example of the first controller 100, a main controller 201 as an example of the second controller 200, and a subcontroller 301 as an example of the third controller 300.

The chassis controller 101 may monitor failure states of the main controller 201 and/or the subcontroller 301.

The chassis controller 101 may receive a longitudinal control command and/or a lateral control command of the vehicle from the main controller 201 and/or the subcontroller 301 for the MRM.

The main controller 201 may determine whether its own system has experienced a failure, and transmit failure state information of the main controller 201 to the chassis controller 101. In addition, the subcontroller 301 may determine whether its own system has experienced a failure, and transmit failure state information of the main controller 201 to the chassis controller 101. The subcontroller 301 may have a redundancy function, and if the main controller 201 fails, may perform an autonomous driving function instead of the main controller 201.

If the main controller 201 fails, the chassis controller 101 may perform an MRM control strategy based on a command of the subcontroller 301 instead of the main controller 201. For example, the chassis controller 101 may control a vehicle to brake at $-1\ m/s^2$ and then stop.

If both the main controller 201 and the subcontroller 301 fail at the same time, the chassis controller 101 may perform the MRM strategy. For example, the chassis controller 101 may control a vehicle to brake at $-4\ m/s^2$ and then stop.

Accordingly, if an ASIL of the subcontroller 301 is lower than an ASIL of the main controller 201, the sub-controller 301 is inappropriate for functional safety to monitor the failure of the main controller 201, since the chassis controller 101 determines the failure of the main controller 201 and performs the MRM, there is no need to increase the ASIL of the subcontroller 301, thereby minimizing a cost thereof, and even if the main controller 201 fails, it is possible to quickly cope with the failure, thereby increasing safety of the autonomous vehicle.

For example, if the subcontroller 301 is a front camera capable of responding to Level 2 of the autonomous driving function, it is possible to accurately determine and respond to the failure of the main controller 201 even while using the existing subcontroller 301 of Level 2 of the autonomous driving function as it is without a need for a separate level increase of the subcontroller 301.

Figure 4:
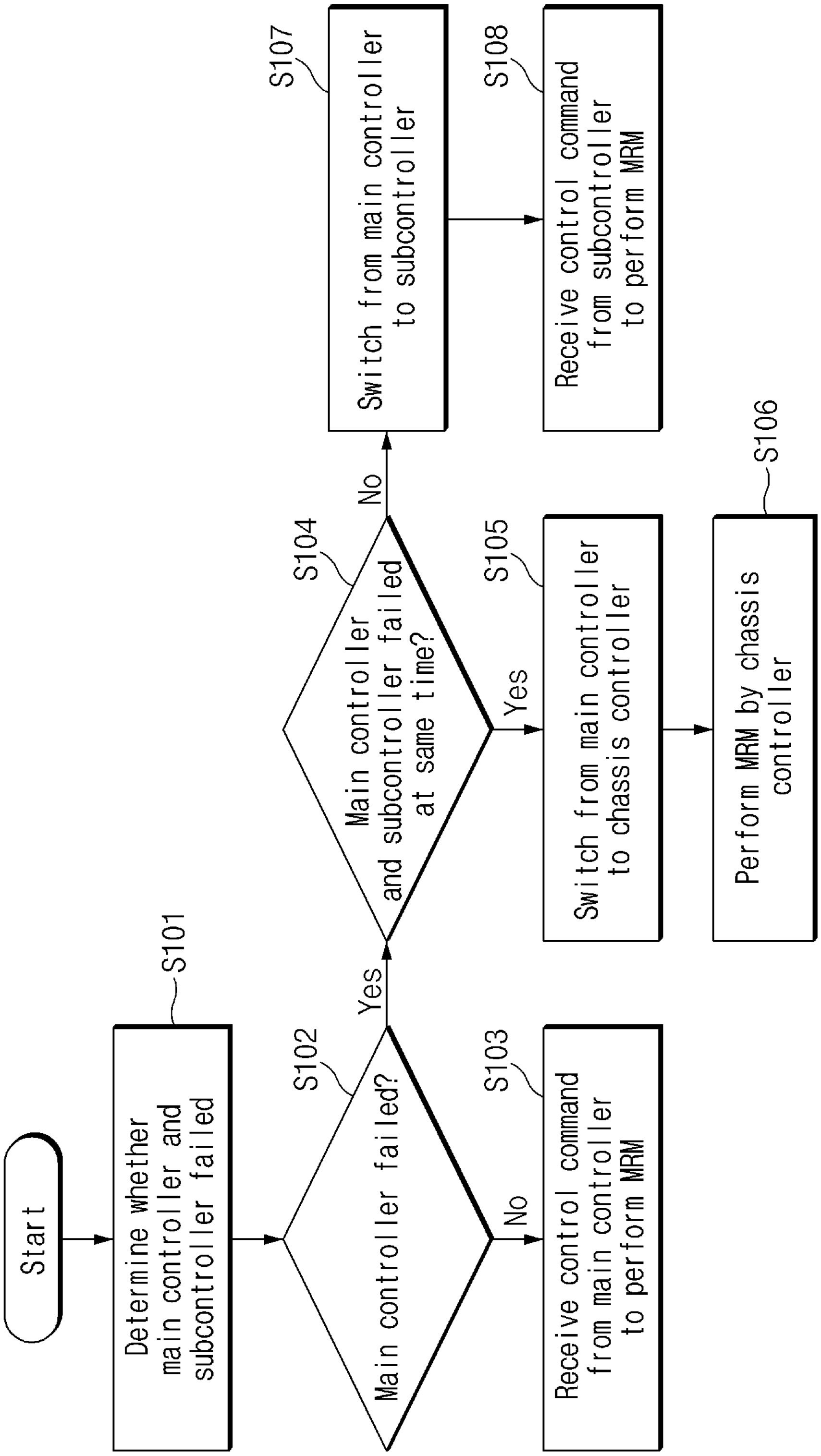
FIG. 4 illustrates a flowchart showing an example vehicle control method.

Hereinafter, a vehicle control method according to an exemplary embodiment of the present disclosure will be described in detail with reference to FIG. 4. FIG. 4 illustrates a flowchart for describing an example vehicle control method.

Hereinafter, it is assumed that the vehicle control apparatus 10 of the of FIG. 1 performs processes of FIG. 4. In addition, in the description of FIG. 4, operations described as being performed by a device may be understood as being controlled by the processor 140 of the vehicle control apparatus 10.

Referring to FIG. 4, the chassis controller 101 may determine whether the main controller 201 and the subcontroller 301 fail (S101). The chassis controller 101 may determine the failure based on a failure state signal received from the main controller 201 and the subcontroller 301, or may determine the failure of the main controller 201 and the subcontroller 301 by using timeout through CAN communication, a cyclic redundancy check (CRC) error, which is a standard for determining whether a CAN signal is normal, an alive counter to determine a failure if it is stuck for more than a certain period of time.

The chassis controller 101 may determine whether the main controller 201 fails as a result of the failure determination in step S101 (S102), and if the main controller 201 does not fail, may receive a control command for the MRM from the main controller 201 to perform the MRM (S103).

Meanwhile, if the main controller 201 fails, the chassis controller 101 may determine whether the main controller 201 and the subcontroller 301 have both failed (S104).

Accordingly, if it is determined that both the main controller 201 and the subcontroller 301 have failed, the chassis controller 101 may switch control of the autonomous driving control from the main controller 201 to the chassis controller 101 (S105) (e.g., the main controller 201 cedes control to the chassis controller 101 with respect to autonomous driving).

Accordingly, the chassis controller 101 may perform the MRM by itself independent of the main controller 201 and the subcontroller 301 (S106).

Meanwhile, if only the main controller 201 fails in step S104, the chassis controller 101 may switch control of the autonomous driving from the main controller 201 to the subcontroller 301 (S107) (e.g., the main controller 201 cedes control to the subcontroller 301 with respect to autonomous driving).

Accordingly, the chassis controller 101 may receive a control command (e.g., a longitudinal control command, a lateral control command, deceleration, etc.) from the subcontroller 301 to perform the MRM (S108).

Regardless of an autonomous driving level or an ASIL of the subcontroller 301, it may be possible to increase safety of an autonomous driving function by determining (e.g., detecting) the failure of the main controller 201 by the chassis controller 101 and switching control of the MRM from the main controller 201 to the chassis controller 101 and performing the MRM (e.g., the main controller 201 cedes control to the chassis controller 101 with respect to the MRM).

Figure 5:
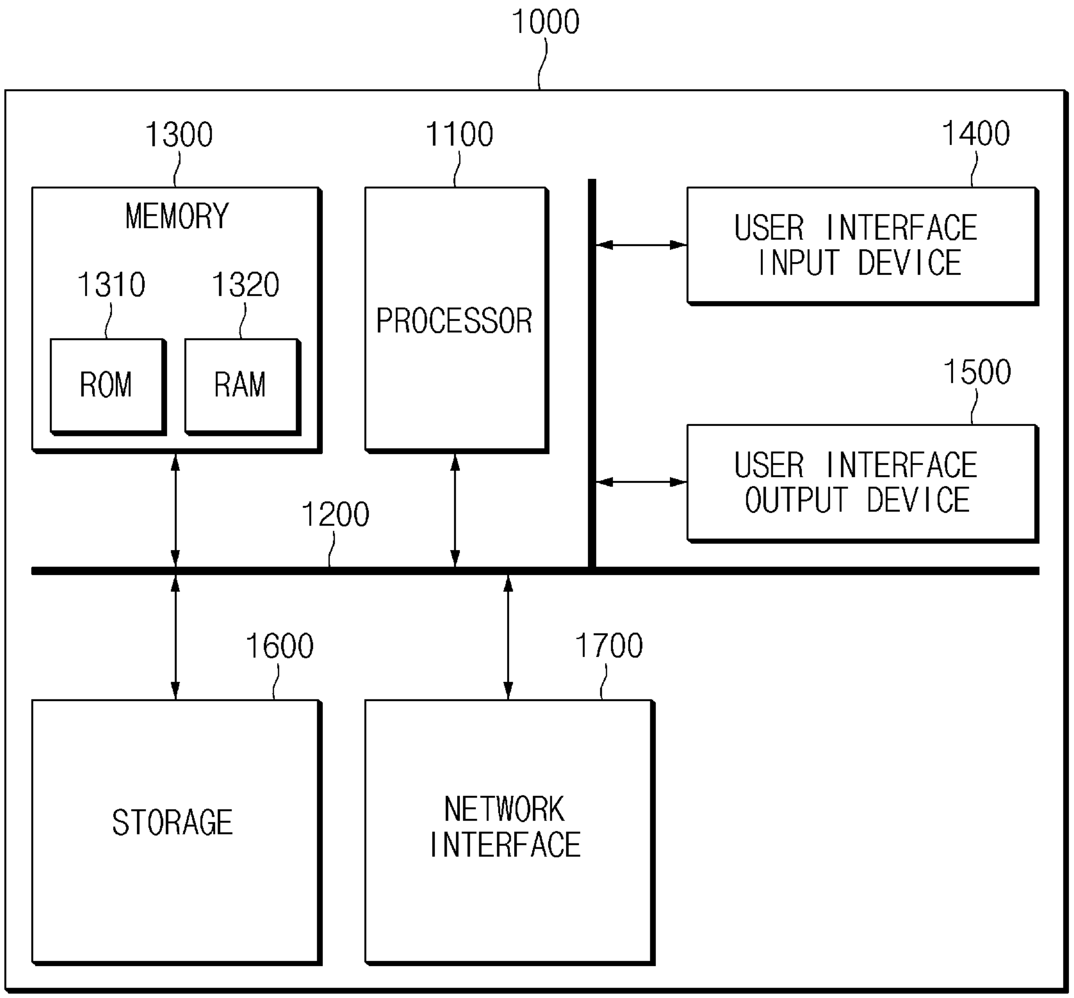
FIG. 5 illustrates an example computing system.

FIG. 5 illustrates an example computing system.

Referring to FIG. 5, the computing system 1000 may include at least one processor 1100 connected through a bus 1200, a memory 1300, a user interface input device 1400, a user interface output device 1500, and a storage 1600, and a network interface 1700. The processor 1100 may be one or more central processing units (CPUs) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and/or a random access memory (RAM) 1320.

Steps of a method or algorithm described in connection with the exemplary embodiments disclosed herein may be directly implemented by hardware, a software module, or a combination of the two, executed by the processor 1100. The software module may reside in a storage medium (e.g., the memory 1300 and/or the storage 1600) such as a RAM memory, a flash memory, a ROM memory, an EPROM memory, an EEPROM memory, a register, a hard disk, a removable disk, and a compact disc ROM (CD-ROM).

An exemplary storage medium may be coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A vehicle control apparatus of a vehicle, the vehicle control apparatus comprising:

a first controller installed in the vehicle and configured to control one or more safety features of the vehicle;

a second controller installed in the vehicle and configured to perform primary control of autonomous driving of the vehicle and to perform minimum risk maneuver (MRM) control; and a third controller installed in the vehicle and configured to perform secondary control of the autonomous driving of the vehicle, wherein the first controller is further configured to:

determine whether the second controller or the third controller fails during the autonomous driving of the vehicle, and based on determining that the second controller or the third controller has failed, perform an autonomous driving function of the vehicle, and wherein after the vehicle control apparatus requests transfer of control authority to a user during autonomous driving of the vehicle, based on a failure of the user to take over control authority from the vehicle control apparatus, the vehicle control apparatus is configured to:

perform an MRM for reducing a speed of the vehicle and stopping the vehicle, and based on a failure of the second controller occurring during performance of the MRM, continue the MRM using the first controller, wherein the continuing the MRM using the first controller comprises switching an MRM operation by causing the first controller to initiate the MRM without receiving an MRM instruction from the second controller, and wherein the MRM initiated by the first controller comprises a first MRM operation controlled by an MRM instruction of the third controller or a second MRM operation not controlled by the MRM instruction of the third controller.

2. The vehicle control apparatus of claim 1, wherein the first controller is a chassis subcontroller, and wherein the first controller is further configured to determine a failure state of at least one of the second controller or the third controller by determining disconnection of wired communication with the at least one of the second controller or the third controller.

3. The vehicle control apparatus of claim 1, wherein the first controller is equipped in the vehicle to control at least one device of the vehicle, and wherein the second controller and the third controller are equipped in the vehicle for autonomous driving control.

4. The vehicle control apparatus of claim 1, wherein the first controller is further configured to, based on the second controller failing and further based on a command from the third controller, perform the MRM.

5. The vehicle control apparatus of claim 1, wherein the first controller is further configured to, based on the second controller and the third controller failing, perform the MRM without receiving any vehicle control commands from the second controller or the third controller.

6. The vehicle control apparatus of claim 5, wherein the vehicle control commands include at least one of a longitudinal control command or a lateral control command.

7. The vehicle control apparatus of claim 1, wherein the second controller includes an electronic control unit (ECU), and wherein the third controller includes a front camera.

8. The vehicle control apparatus of claim 1, wherein at least one of the second controller or the third controller is configured to transmit failure state information to the first controller based on a determination of a failure state of the at least one of the second controller or the third controller.

9. The vehicle control apparatus of claim 8, wherein the first controller is further configured to determine the failure state of the at least one of the second controller or the third controller based on the failure state information received from the at least one of the second controller or the third controller.

10. The vehicle control apparatus of claim 1, wherein the first controller is further configured to determine a failure state of at least one of the second controller or the third controller by determining disconnection of wired communication with the at least one of the second controller or the third controller.

11. A vehicle control apparatus of a vehicle, the vehicle control apparatus comprising:

one or more processors installed in the vehicle; and memory storing instructions that, when executed by the one or more processors, cause the vehicle control apparatus to:

detect a failure of at least one of;

a main controller, installed in the vehicle, configured to perform primary control of autonomous driving of the vehicle and to perform minimum risk maneuver (MRM) control, or an auxiliary controller, installed in the vehicle, configured to perform secondary control of the autonomous driving of the vehicle; and based on detecting the failure of the at least one of the main controller or the auxiliary controller, perform an autonomous driving function of the vehicle, wherein after the vehicle control apparatus requests transfer of control authority to a user during autonomous driving of the vehicle, based on a failure of the user to take over control authority from the vehicle control apparatus, the instructions, when executed by the one or more processors, cause the vehicle control apparatus to:

perform an MRM for reducing a speed of the vehicle and stopping the vehicle, and based on a failure of the main controller occurring during performance of the MRM, continue the MRM using the auxiliary controller, wherein the continuing the MRM using the auxiliary controller comprises switching an MRM operation by causing the auxiliary controller to initiate the MRM without receiving an MRM instruction from the main controller, and wherein the MRM initiated by the auxiliary controller comprises a first MRM operation controlled by an MRM instruction of a third controller or a second MRM operation not controlled by the MRM instruction of the third controller.

12. The vehicle control apparatus of claim 11, wherein the instructions, when executed by the one or more processors, further cause the vehicle control apparatus to:

based on the main controller and the auxiliary controller failing, perform the MRM without receiving any vehicle control commands from the main controller or the auxiliary controller.

13. The vehicle control apparatus of claim 11, wherein the main controller includes an electronic control unit (ECU), and wherein the auxiliary controller includes a front camera.

14. A method comprising:

determining, by a first controller installed in a vehicle, whether a second controller installed in the vehicle or a third controller installed in the vehicle fails during autonomous driving of the vehicle, wherein the second controller performs primary control of the autonomous driving of the vehicle and is configured to perform minimum risk maneuver (MRM) control, and wherein the third controller performs secondary control of the autonomous driving of the vehicle; and performing, by the first controller and based on determining that the second controller or the third controller has failed, an autonomous driving function of the vehicle, wherein the performing of the autonomous driving function of the vehicle comprises:

after requesting, by the vehicle, transfer of control authority to a user during autonomous driving of the vehicle, based on a failure of the user to take over control authority from the vehicle:

performing, by the vehicle, an MRM for reducing a speed of the vehicle and stopping the vehicle, and based on a failure of the second controller occurring during performance of the MRM, continuing the MRM using the first controller, wherein the continuing the MRM using the first controller comprises switching an MRM operation by causing the first controller to initiate the MRM without receiving an MRM instruction from the second controller, and wherein the MRM initiated by the first controller comprises a first MRM operation controlled by an MRM instruction of the third controller or a second MRM operation not controlled by the MRM instruction of the third controller.

15. The method of claim 14, wherein the first controller is a chassis subcontroller, and wherein the first controller is further configured to determine a failure state of at least one of the second controller or the third controller by determining disconnection of wired communication with the at least one of the second controller or the third controller.

16. The method of claim 14, wherein the first controller is equipped in the vehicle to control at least one device of the vehicle, and wherein the second controller and the third controller are equipped in the vehicle for autonomous driving control.

17. The method of claim 14, wherein the performing the autonomous driving function of the vehicle comprises:

performing, by the first controller, the MRM based on the second controller failing and further based on a command from the third controller.

18. The method of claim 14, wherein the determining that the second controller or the third controller has failed comprises:

determining, by the second controller or the third controller, a failure state and transmitting failure state information to the first controller; and determining, by the first controller, the failure state of the second controller or the third controller based on the failure state information.

19. The vehicle control apparatus of claim 11, wherein a safety controller comprises the one or more processors, and wherein the safety controller is configured to detect, via an in-vehicle communication within the vehicle, a failure of at least one of the main controller or the auxiliary controller.

* * * * *